(12) United States Patent
Kishimoto et al.

(10) Patent No.: US 9,375,811 B2
(45) Date of Patent: Jun. 28, 2016

(54) ACTIVE METAL BRAZING MATERIAL

(75) Inventors: Takaomi Kishimoto, Gunma (JP);
Kouzou Kashiwagi, Gunma (JP);
Osamu Sakaguchi, Gunma (JP)

(73) Assignee: TANAKA KIKINZOKU KOGYO K.K., Tokyo (JP)

( * ) Notice: Subject to any disclaimer, the term of this patent is extended or adjusted under 35 U.S.C. 154(b) by 197 days.

(21) Appl. No.: 14/110,709

(22) PCT Filed: May 21, 2012

(86) PCT No.: PCT/JP2012/062890
§ 371 (c)(1),
(2), (4) Date: Oct. 8, 2013

(87) PCT Pub. No.: WO2012/161148
PCT Pub. Date: Nov. 29, 2012

(65) Prior Publication Data
US 2014/0037492 A1 Feb. 6, 2014

(30) Foreign Application Priority Data
May 24, 2011 (JP) ................. 2011-115593

(51) Int. Cl.
*B23K 35/30* (2006.01)
*C04B 37/00* (2006.01)
*C22C 5/08* (2006.01)
*B23K 35/40* (2006.01)
*B23K 35/02* (2006.01)
*C22F 1/14* (2006.01)

(52) U.S. Cl.
CPC ......... *B23K 35/3006* (2013.01); *B23K 35/0227* (2013.01); *B23K 35/40* (2013.01); *C04B 37/006* (2013.01); *C22C 5/08* (2013.01); *C22F 1/14* (2013.01); *C04B 2235/96* (2013.01); *C04B 2237/125* (2013.01); *C04B 2237/126* (2013.01); *C04B 2237/127* (2013.01); *C04B 2237/343* (2013.01); *C04B 2237/368* (2013.01)

(58) Field of Classification Search
CPC .......... B23K 35/3006; C22C 5/08; C22F 1/14
USPC ................................................. 219/137 WM
See application file for complete search history.

(56) References Cited

U.S. PATENT DOCUMENTS

2006/0243776 A1    11/2006   Tada et al.

FOREIGN PATENT DOCUMENTS

| EP | 035603 A | 4/1985 |
|---|---|---|
| JP | S61-82995 A | 4/1986 |
| JP | S61 82995 A | 4/1986 |
| JP | H07-016789 | 1/1995 |
| JP | H0716789 A | 1/1995 |
| JP | 08310876 A | * 11/1996 |
| JP | 8310976 A | 11/1996 |
| JP | H08-310876 A | 11/1996 |
| JP | H10-236886 A | 9/1998 |
| JP | 2002-292490 A | 10/2002 |
| JP | 2002292490 A | 10/2002 |
| WO | 2005-007596 A1 | 1/2005 |

OTHER PUBLICATIONS

EP 12789732.0 European Search Report for corresponding application, Mar. 30, 2015.

\* cited by examiner

*Primary Examiner* — Weiping Zhu
(74) *Attorney, Agent, or Firm* — Roberts & Roberts, LLP

(57) ABSTRACT

The present invention provides an active metal brazing material composed of a Ag—Cu—Ti—Sn alloy containing by weight 20 to 40% of Cu, 1.0 to 3.0% of Ti, 1.2 to 6.0% of Sn and the balance being Ag, and having a metallographic structure including a Sn—Ti or Cu—Ti intermetallic compound dispersed in a Ag—Cu alloy matrix, wherein the weight ratio Sn/Ti between Ti and Sn is 1.2 or more, and additionally the particle size of the intermetallic compound is 20 μm or less. The foregoing active metal brazing material improves the workability of the hitherto known Ag—Cu—Ti alloy active metal brazing material and enables a critical dimension processing with a high processing rate, and can be produced by melting and casting the foregoing Ag—Cu—Ti—Sn alloy, and by subsequently plastically working the cast at a working rate of 90% or more to make finer the intermetallic compound involved.

2 Claims, No Drawings

ACTIVE METAL BRAZING MATERIAL

BACKGROUND OF THE INVENTION

1. Technical Field

The present invention relates to an active metal brazing material used for bonding materials such as ceramics.

2. Background Art

As the active metal brazing materials used for mutual bonding of ceramics and bonding of a ceramic and a metal, there has hitherto been known a Ag—Cu—Ti alloy, which Ti as an active metal component has been added to a Ag—Cu alloy. The active metal brazing material is frequently used as follows: the raw materials are melted in a vacuum melting furnace, the resulting melt is cast, the resulting cast is processed, for example, by rolling processing into a thin plate shape, and the thin plate is stamped out by press working into an intended shape to be used.

Examples of the problems associated with the active metal brazing material include the workability of the active metal brazing material; specifically, in the foregoing production/processing step, the material tends to undergo cracking, wire breaking and rupture. This is because in the Ag—Cu—Ti alloy, at the time of the cast solidification, an intermetallic compound composed of Cu and Ti, having a size as large as 50 to 100 µm precipitates in the Ag—Cu alloy matrix. The intermetallic compound is extremely hard and strong, hence is not divided in the subsequent plastic working, and thus maintains nearly the size thereof at the precipitation stage. Accordingly, a processing performed to a shape close to the compound particle size causes, for example, cracking. Specifically, for example, a processing into a plate shape is restricted by the thickness limit of 100 µm, and a processing to a thickness equal to or less than the limit is made impossible. Herein, with the recent progress of the miniaturization of electronic/electric components, the active metal brazing materials used are also required to be of a thin type or of a fine type; in this context, conventional Ag—Cu—Ti alloy active metal brazing materials are far from meeting such market demands.

In this connection, it is not meant that there are no method for reducing the particle size of the intermetallic compound composed of Cu and Ti, which precipitate in the Ag—Cu alloy matrix of the Ag—Cu—Ti alloy. For example, in Patent Literature 1, it is known that the Ag—Cu—Ti alloy is maintained when melted at a temperature equal to or higher than the melting point of the compound composed of Cu and Ti, and quenched when cast.

PRIOR ART DOCUMENTS

Patent Literature

Patent Literature 1: Japanese Patent Application Laid-Open No. H7-16789

However, in the above-described case, Ti, which is an active component, tends to be oxidized, and hence the melting is required to be performed under high vacuum; the addition of an apparatus for quenching in the vacuum chamber of a melting furnace complicates the facilities involved, and additionally, the maintenance of such facilities is unfavorable, and such facilities are expensive.

SUMMARY OF THE INVENTION

Problems to be Solved by the Invention

The present invention has been achieved against a backdrop of such circumstances as the background thereof, improves the workability of the Ag—Cu—Ti alloy active metal brazing material, and provides an active metal brazing material processable into such sizes that can meet the demands of the market.

Means for Solving the Problems

In order to solve the foregoing technical problem, the present inventors have designed the Ag—Cu—Ti alloy active metal brazing material in such a way Sn, which is a fourth metal element, is added to the brazing material and the particle size of the compound precipitating in the Ag alloy matrix is controlled without rapidly solidifying the brazing material. The present inventors performed continuously various experiments and investigations on the composition and the production conditions of the Ag—Cu—Ti—Sn alloy active metal brazing material, and consequently have found the following Ag—Cu—Ti—Sn alloy active metal brazing material.

Specifically, the present invention is an active metal brazing material composed of a Ag—Cu—Ti—Sn alloy including 20 to 40% by weight of Cu, 1.0 to 3.0% by weight of Ti, 1.2 to 6.0% by weight of Sn and the balance being Ag, the brazing material having a metallographic structure including a Sn—Ti intermetallic compound or a Cu—Ti intermetallic compound dispersed in a Ag—Cu alloy matrix, wherein the weight ratio Sn/Ti between Ti and Sn is 1.2 or more, and additionally the particle size of the intermetallic compound is 20 µm or less.

The active metal brazing material according to the present invention undergoes the addition of Sn as a fourth metal element, and the addition is based on the tendency to produce intermetallic compounds produced by binding of Sn to Ti and Cu preferentially to the Cu—Ti intermetallic compound. Consequently, the production of the Cu—Ti intermetallic compound is suppressed, and although this does not mean that the Cu—Ti intermetallic compound is absolutely not produced, the Cu—Ti intermetallic compound is hardly produced as a coarse compound.

The intermetallic compound produced by the addition of Sn is composed of Sn—Ti or Sn—Ti—Cu (the proportion of the former is larger), and the intermetallic compound is relatively finer (of the order of 100 µm or less). Moreover, these intermetallic compounds (Sn—Ti, Sn—Ti—Cu) are fine, and additionally, can be made further finer by working, and the particle sizes made fine so as to be 20 µm or less allow the workability to be satisfactory. The significance of the particle size (20 µm or less) of the intermetallic compound in the present invention is the maximum particle size of the intermetallic compound. The shape of the intermetallic compound includes long, irregularly-shaped compounds as well as spherically-shaped compounds, and in such a case, the length in the long axis direction is taken as the particle size. The lower limit of the particle size is preferably 0.1 µm.

As described above, the active metal brazing material according to the present invention improves the workability thereof through the addition of Sn resulting in the preferential precipitation of Sn—Ti or Sn—Ti—Cu to suppress the generation of the coarse Cu—Ti and making finer the Sn—Ti or Sn—Ti—Cu intermetallic compound. Herein, the composition range of the Ag—Cu—Ti—Sn alloy is as described above such that the composition includes 20 to 40% by weight of Cu, 1.0 to 3.0% by weight of Ti, 1.2 to 6.0% by weight of Sn and the balance being Ag. The addition amount of Sn, which is a fourth metal element, is set at 1.2 to 6.0% by weight. This is because when the amount of Sn is less than 1.2% by weight, the growth suppression effect of the Cu—Ti intermetallic compound comes to be insufficient, to cause a possibility that a coarse Cu—Ti intermetallic compound is produced. This is also because when the amount of Sn exceeds 6.0% by weight, the amount of the intermetallic compound comes to be large to result in a tendency to degrade the workability.

In the present invention, the weight ratio Sn/Ti between Ti and Sn in the composition is further required to be 1.2 or more. This is because when the weight ratio Sn/Ti is smaller than 1.2, the coarse Cu—Ti intermetallic compound tends to precipitate to remarkably degrades the workability. The weight ratio Sri/Ti between Ti and Sn is preferably 5.0 or less; the weight ratio larger than 5.0 causes the degradation of the workability.

The production of the brazing material including the Ag—Cu—Ti—Sn alloy having the above-described composition is based on the general melting and casting, and the precipitation of the coarse intermetallic compound is suppressed already from the stage of melting and casting. The intermetallic compound is mainly composed of the intermetallic compound including Sn—Ti, and is also found to partially include another intermetallic compound including Sn—Ti—Cu. The Cu—Ti intermetallic compound is sometimes partially formed, but no compound as coarse as to degrade the workability precipitates.

However, the particle size immediately after the melting and casting is relatively fine, but is still somewhat larger for allowing the workability to be the best (of the order of 100 to 50 μm). Accordingly, in the present invention, the Ag—Cu—Ti—Sn alloy having the foregoing composition is melted and cast, and the cast is plastically worked to a processing rate of 90% or more to rupture the intermetallic compound dispersed in the Ag alloy matrix so as to have a particle size of 20 μm or less. In the present invention, the precipitating intermetallic compounds are mainly Sn—Ti and Sn—Ti—Cu, and these intermetallic compounds are extremely brittle in contrast to the Cu—Ti intermetallic compound, and accordingly these intermetallic compounds can be ruptured in the matrix by the plastic working such as rolling after the melting and casting.

Advantageous Effects of Invention

The foregoing Ag—Cu—Ti—Sn alloy active metal brazing material according to the present invention is improved in workability owing to the intermetallic compound made fine and dispersed in the Ag alloy matrix so as to allow the plastic working to be applied to such an extent that the weight and size of the brazing material are reduced. The Ag—Cu—Ti—Sn alloy active metal brazing material according to the present invention sufficiently possesses brazability (bonding strength), and possesses the performances equal to or higher than the performances of conventional Ag—Cu—Ti alloy active metal brazing materials.

DETAILED DESCRIPTION OF THE PREFERRED EMBODIMENTS

First Embodiment

Hereinafter, the embodiment of the present invention is described on the basis of the examples described below. Here, an active metal brazing material of Ag—Cu(26.0%)-Ti(2.0%)-Sn(5.0%) (Sn/Ti ratio: 2.5) was melted and cast, and then the cast was plastically worked. The active metal brazing material was obtained as an ingot of 100 mm in width, 150 mm in length and 15 mm in thickness by melting the Ag alloy having the foregoing composition in a vacuum melting furnace, and by successively casting the molten alloy into a carbon crucible to be slowly cooled. After the melting and casting, in order to evaluate the particle size of the intermetallic compound precipitated during the casting in the ingot, the cross-sectional metal structure of the ingot was observed and the constituent elements of the precipitating compound were identified by the EDS surface analysis.

In the ingot after the casting, the intermetallic compound was found to have precipitated and dispersed as particles of 80 μm or less. According to the EDS analysis of the precipitate, the intermetallic compound was an intermetallic compound composed of Sn and Ti barely including Cu.

The ingot was plastically worked, and the variation of the particle size (maximum particle size) of the intermetallic compound was investigated. In the investigation, the rolling processing was performed at the processing rates set at 60, 70, 80, 90, 98 and 99.5%, and from the cross-sectional structure after the processing, the particle sizes of the intermetallic compound were measured. In the measurement of the maximum particle size of the intermetallic compound, the cross section of each of the samples was observed in a range of 0.1 mm×1.0 mm with a metallographic microscope at a magnification factor of 1000, and the length in the long-axis direction of the largest particle of the observed particles was taken as the maximum particle size. The results thus obtained are shown in Table 1.

TABLE 1

| Processing rate | Maximum particle size of intermetallic compound |
| --- | --- |
| 0% (After melting and casting) | 80 μm |
| 60% | 40 μm |
| 70% | 25 μm |
| 80% | 21 μm |
| 90% | 18 μm |
| 98% | 12 μm |
| 99.5% | 8 μm |

As can be verified from Table 1, with the increase of the processing rate, the particle size of the intermetallic compound decreases. As can also be verified from Table 1, the processing rate of 90% or more allows the particle size to be 20 μm or less. This is because in the Ag—Cu—Ti—Sn alloy, the intermetallic compound is brittle, and the processing can easily regulate the particle size.

Second Embodiment

Here, the Ag—Cu—Ti—Sn alloy active metal brazing materials having the various compositions shown in Table 2 were produced. Comparative Examples 1 to 4 are the pre-production compositions for limiting the effective composition range of the present invention. Conventional Example is a conventionally used Ag—Cu—Ti alloy active metal brazing material, listed for comparison with Examples.

TABLE 2

| | Ag (% by weight) | Cu (% by weight) | Ti (% by weight) | Sn (% by weight) | Sn/Ti ratio |
| --- | --- | --- | --- | --- | --- |
| Example 1 (First Embodiment) | 67.0 | 26.0 | 2.0 | 5.0 | 2.5 |
| Example 2 | 68.4 | 26.6 | 2.0 | 3.0 | 1.5 |
| Example 3 | 67.7 | 26.3 | 2.0 | 4.0 | 2.0 |
| Comparative Example 1 | 69.8 | 27.2 | 2.0 | 1.0 | 0.5 |

TABLE 2-continued

|  | Ag (% by weight) | Cu (% by weight) | Ti (% by weight) | Sn (% by weight) | Sn/Ti ratio |
|---|---|---|---|---|---|
| Comparative Example 2 | 69.1 | 26.9 | 2.0 | 2.0 | 1.0 |
| Comparative Example 3 | 65.5 | 25.5 | 2.0 | 7.0 | 3.5 |
| Comparative Example 4 | 63.4 | 24.6 | 2.0 | 10.0 | 5.0 |
| Conventional Example | 70.6 | 27.4 | 2.0 | — | 0.0 |

In each of the foregoing active metal brazing materials, the Ag alloy having the composition specified in Table 2 was melted in a vacuum melting furnace and then cast into a carbon crucible to be slowly cooled, and thus an ingot of 100 mm in width, 150 mm in length and 15 mm in thickness was prepared. Subsequently, each of the alloy ingots was subjected to a rolling processing at a processing rate of 90%, and from the cross-sectional structure after the processing, the particle size of the intermetallic compound was measured. Here, the measurement of the particle size of the intermetallic compound was also performed for each of the ingots after the melting and casting. The results thus obtained are shown in Table 3.

TABLE 3

|  | Particle size of intermetallic compound | |
|---|---|---|
|  | Before processing | After processing |
| Example 1 | 80 μm | 18 μm |
| Example 2 | 83 μm | 20 μm |
| Example 3 | 82 μm | 19 μm |
| Comparative Example 1 | 500 μm | 500 μm |
| Comparative Example 2 | 490 μm | 490 μm |
| Comparative Example 3 | 82 μm | — |
| Comparative Example 4 | 80 μm | — |
| Conventional Example | 510 μm | 510 μm |

*Comparative Examples 3 and 4 were brittle and cracking occurred at a processing stage of a rate of 20%.

The active metal brazing material of each of Examples contained, immediately after the casting, the intermetallic compound as precipitated and dispersed particles of the order of 80 μm. In the EDS analysis of the precipitates, the precipitate of Example 1 was found to be an intermetallic compound being composed of Sn and Ti and containing little Cu, from what has been described above. The precipitates of Examples 2 and 3 were found to be composed of Cu, Sn and Ti. As described above, the compositions of the intermetallic compounds precipitating vary according to the Sn/Ti ratio. However, these intermetallic compounds were made fine by the processing, and the particle sizes (maximum particle sizes) were also found to be 20 μm or less.

On the other hand, in Comparative Examples 1 and 2 and Conventional Example, coarse precipitates of compounds of 100 μm or more were observed, and precipitates of 500 μm were partially identified. The coarse precipitate observed in each of these cases was found to be an intermetallic compound composed of Cu and Ti from the EDS analysis thereof. The coarse precipitates of the intermetallic compound are considered to be formed because of the Sn/Ti ratio being as small as 0.5. The intermetallic compound was not made fine even by the processing after the casting and remained coarse. In Comparative Examples 3 and 4, the addition amount of Sn was increased and the Sn/Ti weight percent ratio was set at 1.2 or more, but the particle sizes of the intermetallic compounds were extremely fine. However, in these cases, the proportions of the intermetallic compounds were high, and the whole materials were brittle and tended to cause cracking, to result in the occurrence of cracking midway during processing.

Next, evaluated was the workability of each of the active metal brazing materials exclusive of the active metal brazing materials of Comparative Examples 3 and 4 where cracking occurred at the stage of processing. The brazing materials (thickness: 1.5 mm) after the processing were repeatedly subjected to rolling and annealing; at the time point when cracking or rupture occurred, the processing was terminated; in the case where neither cracking nor rupture occurred, the processing was applied until the thickness became 50 μm. The results thus obtained are shown in Table 4.

TABLE 4

|  | Result of rolling processing |
|---|---|
| Example 1 | No occurrence of cracking and surface defects down to thickness of 50 μm |
| Example 2 | No occurrence of cracking and surface defects down to thickness of 50 μm |
| Example 3 | No occurrence of cracking and surface defects down to thickness of 50 μm |
| Comparative Example 1 | Occurrence of cracking and surface defects at thickness of 1.0 mm |
| Comparative Example 2 | Occurrence of cracking and surface defects at thickness of 1.0 mm |
| Conventional Example | Occurrence of cracking and surface defects at thickness of 1.0 mm |

As described above, the Ag—Cu—Ti—Sn alloy active metal brazing materials of Examples 1 to 3 allowed the rolling processing to be performed to the thickness of 50 μm. On the other hand, although the Ag—Cu—Ti—Sn alloy active metal brazing materials of Comparative Examples 1 and 2 were of the same type as the brazing materials of Examples 1 to 3, the Ag—Cu—Ti—Sn alloy active metal brazing materials of Comparative Examples 1 and 2, each having a Sn/Ti ratio of less than 1.2, were poor in workability, and underwent the occurrence of cracking at the stage of the thickness of 1.0 mm. This was also the case for the conventional Ag—Cu—Ti alloy active metal brazing material including no Sn added thereto. The processing-induced cracking in each of Comparative Examples 1 and 2 and Conventional Example is ascribable to the precipitation of coarse compound remaining in the material.

Finally, with each of the 0.1 mm-thick plates of Examples 1 and 3 and Conventional Example, two alumina rods of 10 mm×10 mm×20 mm were brazed to each other and two silicon nitride rods of 10 mm×10 mm×20 mm were brazed to each other, in a vacuum atmosphere at 830° C., and then specimens of 3 mm×4 mm×40 mm were cut out from these brazed rods, and were subjected to a four point bending test to measure the breaking strength of each of the specimens at 10 points according to JIS R1601. (The test method followed JIS R1601.) The results thus obtained are shown in Table 5. Consequently, it was verified that in either of the bonding between the alumina ceramic rods and the bonding between the silicon nitride ceramic rods, Examples 1 and 3 were higher in the breaking strength than Conventional Example, and had the practically usable brazing strengths.

TABLE 5

| Material to be brazed | | Breaking strength (Average value) | Breaking position |
|---|---|---|---|
| Alumina | Example 1 | 307 MPa | Alumina |
| | Example 3 | 293 MPa | Alumina |
| | Conventional Example | 98 MPa | Brazed surface |
| Silicon nitride | Example 1 | 340 MPa | Brazed surface |
| | Example 3 | 306 MPa | Brazed surface |
| | Conventional Example | 157 MPa | Brazed surface |

INDUSTRIAL APPLICABILITY

The Ag—Cu—Ti—Sn alloy active metal brazing material according to the present invention includes in the Ag alloy matrix thereof fine compound particles dispersed therein, has satisfactory workability allowing plastic working to such an extent that the weight and the size of the brazing material are reduced, so as to meet the recent miniaturization of electronic and electric components, and further possesses a brazability (bonding strength) equivalent to that of the conventional Ag—Cu—Ti alloy active metal brazing material.

What is claimed is:

1. An active metal brazing material comprising a Ag—Cu—Ti—Sn alloy including 20 to 40% by weight of Cu, 1.0 to 3.0% by weight of Ti, 1.2 to 6.0% by weight of Sn and the balance being Ag, the active metal brazing material having a metallographic structure including a Sn—Ti intermetallic compound and a Sn—Ti—Cu intermetallic compound, and optionally a Cu—Ti intermetallic compound, dispersed in a Ag—Cu alloy matrix, wherein the weight ratio Sn/Ti between Ti and Sn is 1.2 or more but 5.0 or less, and the particle sizes of the intermetallic compounds are all 20 μm or less.

2. A method for producing the active metal brazing material defined in claim 1, comprising the steps of: melting and casting a Ag—Cu—Ti—Sn alloy including 20 to 40% by weight of Cu, 1.0 to 3.0% by weight of Ti, 1.2 to 6.0% by weight of Sn and the balance being Ag, and having a weight ratio Sn/Ti between Ti and Sn of 1.2 to 3.5 to form a cast; and subjecting the cast to plastic working at a working rate of 90% or more to rupture the intermetallic compound in the Ag—Cu—Ti—Sn alloy to a particle size of 20 μm or less.

* * * * *